United States Patent [19]

Vetter et al.

[11] Patent Number: 4,890,491

[45] Date of Patent: Jan. 2, 1990

[54] METHOD AND DEVICE FOR INDICATING THE LEVEL OF LIQUID IN AN AUTOMOBILE FUEL TANK

[75] Inventors: Egon Vetter, Hofheim; Thomas Pfeifer, Eppstein; Heinz-Georg Burghoff, Reichenbach; Werner Daub, Stuttgart, all of Fed. Rep. of Germany

[73] Assignee: VDO Adolf Schindling AG, Frankfurt am Main, Fed. Rep. of Germany

[21] Appl. No.: 228,219

[22] Filed: Aug. 4, 1988

[30] Foreign Application Priority Data

Aug. 4, 1987 [DE] Fed. Rep. of Germany ....... 3725752

[51] Int. Cl.[4] ........................ G01F 23/00; G01F 23/22

[52] U.S. Cl. .................................... 73/290 R; 73/291; 73/113; 73/313; 73/301; 73/304 R; 364/571.05; 364/509

[58] Field of Search ..................... 73/290 R, 291, 301, 73/304 R, 304 C, 313, 113, 114; 364/556, 561, 571.01, 571.05, 509, 424.01, 424.06; 340/618, 619, 620, 621, 622, 623, 624, 625

[56] References Cited

U.S. PATENT DOCUMENTS

| | | | |
|---|---|---|---|
| 3,818,760 | 6/1974 | Howard et al. | 73/291 |
| 4,258,422 | 3/1981 | Dougherty et al. | 73/304 C |
| 4,470,296 | 9/1984 | Kobayashi et al. | 73/291 |
| 4,494,210 | 1/1985 | Miller | 364/510 |
| 4,503,419 | 3/1985 | Kidd et al. | 340/622 |
| 4,545,020 | 10/1985 | Brasfield | 73/290 R |
| 4,564,905 | 1/1986 | Masuda et al. | 364/424 |
| 4,731,730 | 3/1988 | Hedrick et al. | 73/304 C |
| 4,768,377 | 9/1988 | Habelmann et al. | 340/618 |
| 4,782,698 | 11/1988 | Wilson | 73/304 C |

FOREIGN PATENT DOCUMENTS

| | | | |
|---|---|---|---|
| 275240 | 7/1988 | European Pat. Off. | 73/290 R |
| 58-42924 | 3/1983 | Japan | 73/290 R |
| 58-92824 | 6/1983 | Japan | 73/290 R |
| 62-201320 | 9/1987 | Japan | 73/290 R |

*Primary Examiner*—William A. Cuchlinski, Jr.
*Assistant Examiner*—Diego F. F. Gutierrez
*Attorney, Agent, or Firm*—Martin A. Farber

[57] ABSTRACT

A method and a device are provided for displaying the level of liquid in the fuel tank of an automotive vehicle. A liquid-level detector 1 and a display device 3 for indicating liquid level are included in the device. The measurement values of the liquid level are provisionally stored at predeterminable time intervals and compared with the instantaneous measurement values. During travel, increasing measurement values determined by the comparison are not displayed.

5 Claims, 2 Drawing Sheets

METHOD AND DEVICE FOR INDICATING THE LEVEL OF LIQUID IN AN AUTOMOBILE FUEL TANK

FIELD AND BACKGROUND OF THE INVENTION

The present invention relates to a method of indicating the level of liquid in an automobile fuel tank having a liquid-level detector and a display device which are arranged in an automotive vehicle, and to a device for carrying out the method.

An electrothermally operating device which can be used for the monitoring of the liquid level in automotive vehicles is known which contains, as liquid-level detector, a resistance probe which is in heat-conductive communication with the liquid within the tank. To the resistance probe there is connected an electronic signal-processing circuit which comprises a source of constant current, a delay circuit, a comparator and a monitoring device. The monitoring device produces a report when the liquid drops below a certain level. The known device permits a measurement which is substantially independent of the temperature of the liquid and the surrounding temperature (Federal Republic of Germany AS-27 40 289).

In measuring devices of the above-described type, the problem arises in vehicles that the liquid level at the place of installation of the liquid-level detector is affected both by the position of the vehicle with respect to the horizontal and by the movements of the liquid during travel. Accordingly it may seem during travel that there is more liquid in the tank than there actually is.

It is an object of the invention to develop, for the indicating of the level of liquid in an automotive vehicle, a method and a device in which, with a liquid detector and an indicating device for displaying liquid level detected by the detector, an indication of the liquid level which is independent of the position of the vehicle and the movements of the liquid can be obtained upon travel.

SUMMARY OF THE INVENTION

According to the invention, the measured values of the level of the liquid at predeterminable time intervals are provisionally stored and compared with the instantaneous measured values and, increasing measured values upon travel which are determined by the comparison are not indicated. The simulating of an increase in the content of the tank during travel is avoided by this method. On the other hand, if the tank is filled while the engine is running or the ignition on, increasing levels of filling are indicated.

Decreasing measured values noted upon longitudinal and transverse accelerations and upon an inclined position of the vehicle during travel preferably are not indicated. Upon longitudinal and transverse accelerations, the liquid level at the place of installation of the liquid-level detector can increase or decrease, particularly when the level of fuel in the tank is low, without the content of the tank having increased or decreased at the corresponding time. The same is true also with regard to the inclination of the vehicle, for instance upon travel on upgrades or downgrades. If a longitudinal and/or transverse acceleration and/or inclination is noted during travel then the apparent increase or decrease of the content of the tank which is noted on the liquid-level detector due to this is not indicated.

The measurement values are preferably corrected with the automotive vehicle at a standstill as a function of the inclination of the vehicle with respect to the horizontal and of the geometry of the tank and of the liquid-level detector. In this way, the device indicating the amount of liquid in the tank is always correct when the vehicle is at a standstill. At a standstill such a correction is possible due to the unequivocal relationship between tank geometry, the angles of inclination in longitudinal and transverse directions, the measured height of liquid and the volume of liquid in the tank since the surface of the liquid is level. Upon longitudinal and transverse accelerations and sudden changes in inclination, the surface of the liquid is, as a rule, not level, so that an exact determination of the amount of liquid present in the tank is not possible on basis of the geometrical relations between the noted height of liquid, tank geometry and inclination of the tank with respect to a reference level.

A device for carrying out the method described above consists, in accordance with the invention, therein that a liquid-level detector (1) is connected via an analog/digital converter to a microcomputer (26) or microprocessor which has an input which is connected to a velocity sensor (9) in the automotive vehicle, and that the display device (3) is arranged behind the microcomputer (26) or microprocessor.

With this device the display device is prevented from simulating an increase in the amount of liquid in the tank during travel. The indicating of the level which is placed in operation by the ignition key or the running engine, on the other hand, does indicate an increase in liquid upon the filling of the tank.

In a preferred embodiment, a sensor (24) for the longitudinal inclination and longitudinal acceleration and a sensor (25) for the transverse inclination and transverse acceleration of the automotive vehicle are connected to the analog-to-digital converter, a characteristic curve for the eliminating of the influence of the inclination on the indication of the liquid level being present in a read-only memory (29) of the microcomputer (26) or microprocessor. Longitudinal and transverse accelerations as well as inclinations are related physical variables due to the unequivocal direction of the acceleration of gravity, so that the same sensors are advisedly used for the longitudinal and transverse acceleration and for the longitudinal and transverse inclination. One advantage of this device is that upon travel during which acceleration takes place and/or upon travel on streets and roads which are inclined with respect to the horizontal, an increase or decrease in the amount of liquid in the tank is not erroneously displayed. Particularly in the case of longer uphill and downhill travel as well as on curves, the influence of acceleration on the display is therefore eliminated. The characteristic curve for the eliminating of the influence of the inclination, namely the so-called "immersion characteristic curve", contains the association of the volume of liquid in the tank to the height of liquid detected on the liquid-level detector, the longitudinal transverse inclination and the preestablished geometry of the tank. The tank contents for the measured values of the height of level and the angle of inclination in both the principal axes of the vehicle, which at standstill correct the measured values of the level of filling, are stored in the read-only memory. During travel, as a result of the nonlevel surface of the liquid upon accelerations, the increase and decrease of the content of the tank is not displayed in order to avoid undesirably large and varying display value.

Another device for the carrying out of the method described above consists, in accordance with the invention, therein that a memory (5) can be connected via a switch (6) which can be actuated at predeterminable time intervals to the liquid-level detector (1); that behind the liquid-level detector (1) and the memory (5) there is arranged a comparator (4) the output of which is connected to an input of a gate circuit (8) the other input of which is connected to a velocity sensor (9) in the vehicle and that the gate circuit controls the opening of the switch (6) and a changeover switch (2) by which the liquid detector (1) or the memory (5) can be connected to the display device (3). In the case of this device also the display device is prevented from simulating an increase in the content of the tank during travel.

In another suitable embodiment, a correction circuit (13) is arranged between the liquid-level detector (1) and the display device (3), it being connected to inclination sensors (16, 18) for the longitudinal and transverse inclination of the vehicle. The correction circuit processes the signals produced by the liquid-level detector and the inclination sensors in accordance with the geometry of the tank and the liquid-level detector. The output signal of the correction circuit correctly indicates the level to which the tank is full.

In a preferred embodiment, the display device (3) has a weakly acting damping device which is activated with a time delay of a few minutes when the ignition is turned on and the car is at a standstill. The weak damping prevents the liquid display from changing suddenly upon a lengthy stop of the vehicle on an incline.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
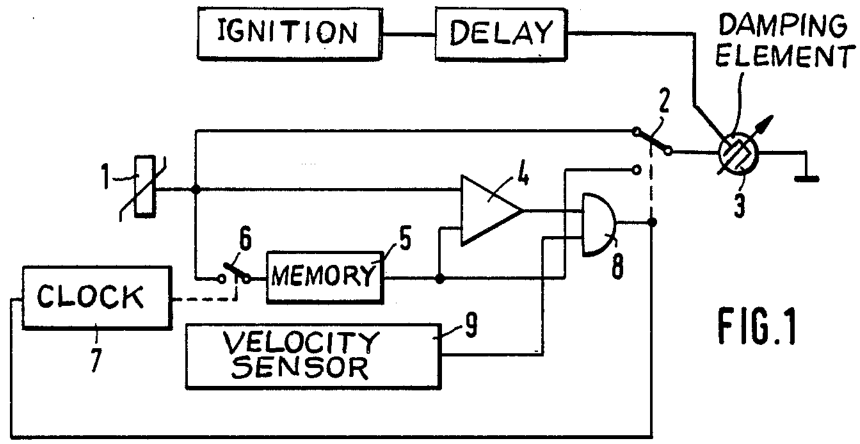
FIG. 1 is a block diagram of a device for displaying the liquid level in an automobile fuel tank.

A liquid-level detector 1, for instance a resistance sensor, which is arranged in a tank (not shown) of an automotive vehicle is connected, via a changeover switch 2, to a display device 3. As display device 3, a pointer instrument which operates in accordance with the galvanometer principle is, for instance, used. To the liquid-level detector 1 there is connected an input of a comparator 4 the second input of which is connected to a memory 5. The input of the memory 5 is connected via another switch 6 to the output of the liquid-level detector 1. The switch 6 is periodically closed and opened by a clock generator 7. In order to exclude the influence of different surrounding temperatures on the measurement, the liquid-level detector 1, in the event that it is developed as a resistance sensor, is connected, for instance, in the manner shown in Federal Republic of Germany AS No. 27 40 289 to a source of constant current, a delay circuit, an invertor and an RC member, the outputs of the invertor and of the RC member being connected to the changeover switch 2, the switch 6 and the comparator 4. Such a measure is not necessary if a liquid-level detector which is independent of the surrounding temperature is used.

A gate circuit 8 which actuates the changeover switch 2 is connected to the comparator 4 which at its output gives off a control signal when the value contained in the memory 5 is less than the measured value given off by the liquid-level detector 1. A second input of the gate circuit 8 is connected to a velocity sensor 9. The arrangement shown in FIG. 1 is supplied with operating voltage when the ignition is on. Only during travel does the velocity sensor 9 give off an output signal which, in combination with a corresponding output signal of the comparator 4, opens the gate circuit 8. Only when the gate circuit 8 is open is the changeover switch 2 connected to the memory 5. With the gate circuit 8 closed, the changeover switch 2 is in the rest-contact position in which the display device 3 is connected to the liquid-level detector 1.

With the ignition turned on and/or the engine operating, the measurement value produced by the liquid-level detector 1 is visible on the display device 3. If liquid is introduced into the tank, then the measured value increases, as can be noted from the display 3. During travel no liquid is introduced into the tank. Changes in the inclination of the vehicle with respect to the horizontal and movements of the liquid as a result of processes of acceleration and braking can simulate an increase in the content of the tank at the location of the liquid-level detector 1 so that an unreliable indication of the content of the tank is produced. In order to prevent this, the output of the liquid-level detector 1 is periodically connected to the memory 5. The measurement value contained in the memory 5 is compared by the comparator 4 with the measurement value present at the liquid-level detector 1. If the measurement value present at the liquid-level detector 1 exceeds the stored measurement value then the comparator 4 gives off a corresponding signal which, in combination with the output signal of the velocity sensor 9, opens the gate circuit 8. Via the output signal of the gate circuit 8, the changeover switch is moved into its operating position in which the display device 3 is connected to the memory 5. The clock generator 7 has a control input, not further designated, which is connected to the output of the gate circuit 8. As soon as the gate circuit 8 has been opened, the clock generator 8 is stopped immediately upon the actuation of the changeover switch 2 so that no new measurement values are taken over in the memory 5. When the measurement values at the output of the liquid-level detector 1 are less than the stored measurement value, the comparator 4 closes the gate circuit 8, as a result of which the clock generator 7 again produces clock pulses and the changeover switch 2 is placed in its rest-contact position. Therefore no increasing content of the tank is displayed during travel with the device shown in FIG. 1.

Figure 2:
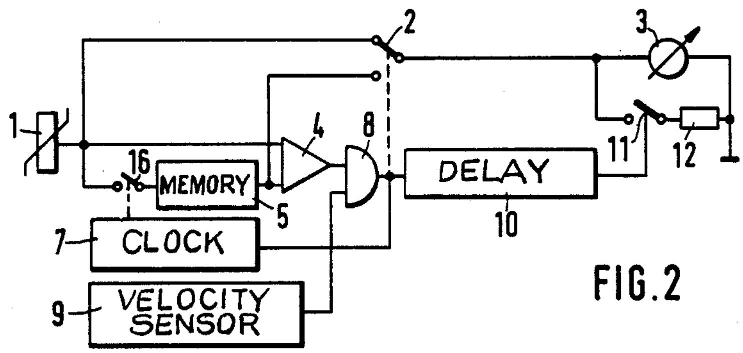
FIG. 2 is a block diagram of another embodiment of a device for indicating the liquid level in an automobile fuel tank.

The device shown in FIG. 2 agrees substantially with the device shown in FIG. 1. Identical parts have been provided with the same reference numbers in FIGS. 1 and 2. In the arrangement according to FIG. 2, a time-delay circuit 10 is additionally connected to the gate circuit 8. Parallel to the display device 3 there is arranged another switch 11 in series with a resistor 12. The switch 11 is controlled by the time-delay circuit 10. By the signal flanks which occur upon the closing of the gate circuit 8, the time-delay circuit 10 is started, its delay time being set to about 2–3 minutes. Upon the stopping of the vehicle, the velocity sensor 9 closes the gate circuit 8, as a result of which the time delay circuit 10 is started. After the termination of the delay time, the time delay circuit 10 closes the switch 11, as a result of which the display device is slightly damped. As a result of this slight damping, the display is prevented from effecting a sudden jump upon lengthy stopping with the vehicle on an incline.

Figure 3:
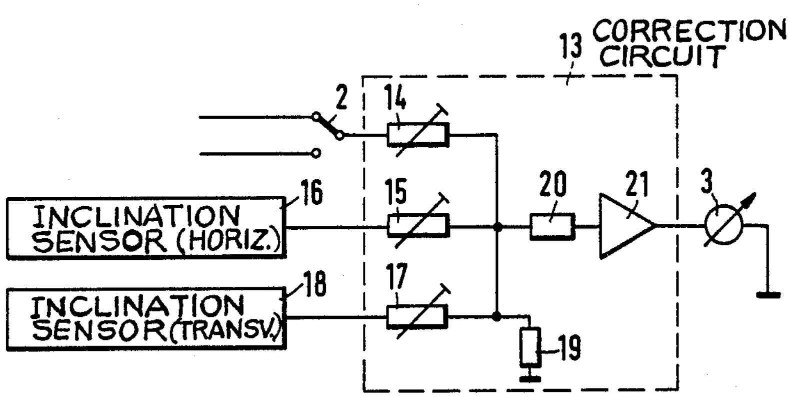
FIG. 3 is a diagram of a correction circuit for an accurate tank display upon longitudinal and transverse inclination of an automotive vehicle.

In the arrangement shown in FIG. 3, a correction circuit 13 is arranged between the changeover switch 2 and the display device 3. The correction circuit 13 contains a first variable resistor 14 which is connected to the changeover switch 2. A second variable resistor 15 is connected to a first inclination sensor 16 for the longitudinal inclination of the vehicle with respect to the horizontal. A third variable resistor 17 is connected to a second inclination sensor 18 for the transverse inclination of the vehicle. The three resistors 14, 15, 17 are connected to each other at their second ends and to resistors 19, 20 one of which is at reference potential and the other connected to an input of an operational amplifier 21 behind which the display device 3 is connected.

The output signals of the inclination sensors 16, 18 are so superimposed on the output signal of the changeover switch 2 that in the event of a constant amount of liquid in the tank upon the increase of the level of the liquid at the place of the liquid-level detector 1 and in case of signals indicating the inclination of the vehicle, an increase of the output signal of the operational amplifier 21 is prevented. Upon a decrease of the level of the liquid at the place of the liquid-level detector 1 despite constant content in the tank and with signals indicating the inclination of the vehicle, a decrease in the output signal of the operational amplifier 21 is prevented.

The geometry of the tank and of the liquid-level detector 1 determines the extent of the increase or decrease of the liquid at predetermined inclinations. This can be taken into consideration by adjusting the resistors 14, 15, 17.

The devices described above are more favorable for the determination of additional filling of gas at the display device than a hysteresis circuit which responds only upon an increase in the content by a predeterminable amount of liquid. Small increases cannot be detected with such a device. If the hysteresis namely is set too small then false tank contents can be displayed in the event of dynamic stresses in travel.

Figure 4:
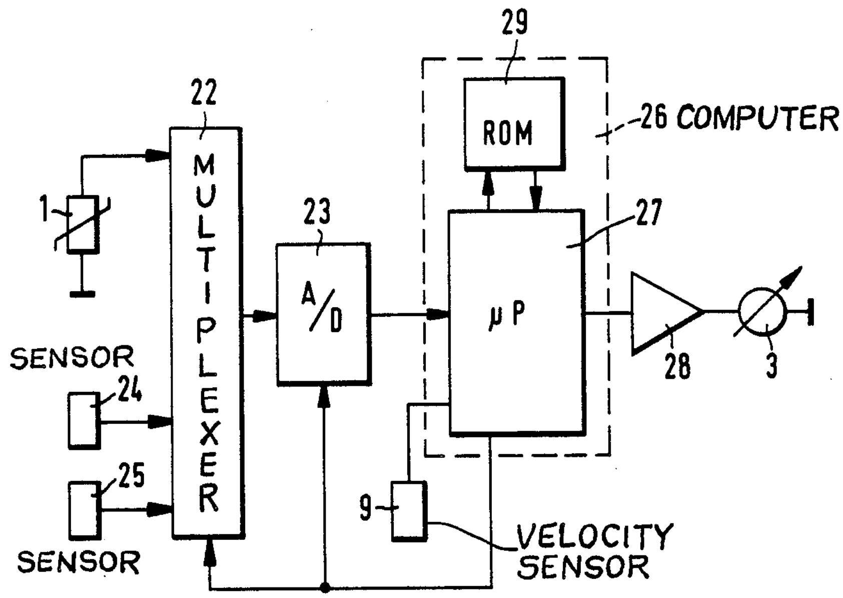
FIG. 4 is a block diagram of another device for displaying the level of liquid in an automobile fuel tank.

In the embodiment shown in FIG. 4, the liquid-level detector 1 is connected by a multiplexer 22 to an analog-to-digital converter 23. Furthermore, sensors 24, 25 are connected to inputs of the multiplexer 22. The sensor 24 gives off a signal which is dependent on the longitudinal acceleration and longitudinal inclination of the vehicle. The sensor 25 gives off a corresponding signal for the transverse acceleration and transverse inclination of the automotive vehicle. Since accelerations and inclinations which are detectable via the constant acceleration of gravity are related physical magnitudes, inclinations and accelerations are measured with the same sensors.

To the analog-to-digital converter 23 there is connected a microcomputer 26 which has, for instance, a microprocessor 27. The velocity sensor 9 is connected to one input of the microcomputer 26. An output of the microcomputer 26, which controls the analog-to-digital converter 23 and the multiplexer 22, is connected via a driver stage 28 to the display device 3. The microcomputer 26 contains a read-only memory 29 (ROM).

In the read-only memory 29 there is contained a table from which the association of the content of the tank to the inclination and height of filling of the liquid-level detector 1 can be noted with due consideration of the geometry of the tank. This table corresponds to an "immersion characteristic curve". From the height of level measured by the liquid-level detector, the corresponding content of the tank is corrected with the vehicle at a standstill by means of the instantaneous inclination values in longitudinal and transverse direction via the "immersion characteristic" curve, so as to display the content of the tank correctly and accurately. The falsification of the display based on the inclination is therefore eliminated.

During travel an increase or decrease in the content of the tank which is simulated as a result of accelerations and/or inclinations is suppressed by means of the sensors 9, 24 and 25.

The advantage of a correction of the display during travel by means of the sensors 24, 25 resides in the fact that not only an erroneous display by a slow rise of the display values but also an erroneous display by slow decrease–caused by the existing damping–upon long curves and uphill and downhill travel is avoided.

During travel, i.e. in combination with the velocity signal, the sensors 24, 25 then prevent the display of a decreasing display value when acceleration signals occur.

We claim:

1. A method of indicating the level of liquid in an automobile fuel tank, the method employing a liquid-level detector and a display device which are disposed in an automobile vehicle, the method comprising steps of:

provisionally storing values of the level of the liquid measured at successive predeterminable time intervals;

comparing said measured values with values subsequently measured;

cancelling subsequently measured values which upon travel are determined by the comparing step to have increased, so as not to indicate increased measured values on the display device;

sensing longitudinal and transverse accelerations and an inclined position of the vehicle during travel; and rejecting measured values obtained during longitudinal and transverse accelerations and obtained during an inclined position of the vehicle during travel.

2. A method according to claim 1, further comprising a step of correcting measured values with the automotive vehicle at a standstill as a function of the inclination of the vehicle with respect to the horizontal and of the geometry of the tank and of the liquid-level detector.

3. A system for indicating the level of a liquid in an automotive fuel tank, disposed in a vehicle, the system comprising:

a liquid level detector in said tank;

a display device carried upon the vehicle;

a computer with an analog-to-digital converter;

a sensor of the longitudinal inclination and longitudinal acceleration of the vehicle;

a sensor of the transverse inclination and transverse acceleration of the vehicle, both said sensors being connected to the analog-to-digital converter;

a velocity sensor carried by the vehicle; and wherein the liquid-level detector is connected via the analog-to-digital converter to the computer, an input of the computer being connected to the velocity sensor, the display device being connected to an output port of the computer; and said computer is operative to suppress changes in liquid level in the tank detected by said detector as a result of longitudinal and transverse accelerations obtained during an inclined position of the vehicle during travel 4. A system according to claim 3, wherein said computer includes a read-only memory storing a characteristic curve for the eliminating of the influence of the inclination on the indication of the liquid level.

5. A system according to claim 4, further comprising:

a correction circuit arranged between the liquid-level detector and the display device, the correction circuit being connected to both said sensors for the longitudinal and transverse inclination of the vehicle.

* * * * *